(12) United States Patent
Davis

(10) Patent No.: US 8,726,763 B2
(45) Date of Patent: May 20, 2014

(54) BINARY GEARBOX

(75) Inventor: John P. Davis, Northampton (GB)

(73) Assignees: John P. Davis, Northampton (GB); Brian M. O'Connor, Palm City, FL (US)

( * ) Notice: Subject to any disclaimer, the term of this patent is extended or adjusted under 35 U.S.C. 154(b) by 1232 days.

(21) Appl. No.: 12/303,355

(22) PCT Filed: Jun. 7, 2006

(86) PCT No.: PCT/US2006/022004
§ 371 (c)(1), (2), (4) Date: Aug. 19, 2009

(87) PCT Pub. No.: WO2007/142637
PCT Pub. Date: Dec. 13, 2007

(65) Prior Publication Data
US 2010/0037727 A1 Feb. 18, 2010

(51) Int. Cl.
*F16H 37/06* (2006.01)

(52) U.S. Cl.
USPC ........................................ 74/665 G

(58) Field of Classification Search
USPC .............. 74/329, 331, 340, 330, 339, 665 G; 475/218, 219, 209
See application file for complete search history.

(56) References Cited

U.S. PATENT DOCUMENTS

| | | | | |
|---|---|---|---|---|
| 3,537,335 A | * | 11/1970 | Aizpiri Ezpeleta | 477/123 |
| 4,106,358 A | * | 8/1978 | Morrison | 74/331 |
| 5,383,375 A | * | 1/1995 | Ogawa et al. | 74/330 |
| 6,397,693 B1 | * | 6/2002 | Umemoto et al. | 74/333 |
| 6,595,077 B1 | * | 7/2003 | Geiberger et al. | 74/330 |
| 6,712,189 B2 | * | 3/2004 | Hirt | 192/84.6 |
| 6,988,426 B2 | | 1/2006 | Calvert | |
| 7,004,878 B2 | * | 2/2006 | Gumpoltsberger et al. | 475/218 |
| 7,070,534 B2 | * | 7/2006 | Pelouch | 475/214 |
| 7,107,866 B2 | * | 9/2006 | Baldwin et al. | 74/331 |
| 7,409,886 B2 | * | 8/2008 | Gitt | 74/342 |
| 2006/0169076 A1 | * | 8/2006 | Gumpoltsberger et al. | 74/330 |

* cited by examiner

*Primary Examiner* — Troy Chambers
*Assistant Examiner* — Jude Agendia
(74) *Attorney, Agent, or Firm* — Hodgson Russ LLP

(57) ABSTRACT

A gearbox comprises a plurality of gear pairs each having a specific gear ratio, and a plurality of selectors each mounted between two gear pairs for selecting one of the two gear pairs, wherein the gear ratio of the selected gear pair is cascaded through an output shaft to another two gear pairs having another selector, and so on. In this way, the effective or aggregate gear ratio of the gearbox is the product of the gear ratios of the selected gear pairs. Thus, the number of available output speeds excluding neutral is given by $2^n$, where n=(number of gear pairs)/2.

22 Claims, 10 Drawing Sheets

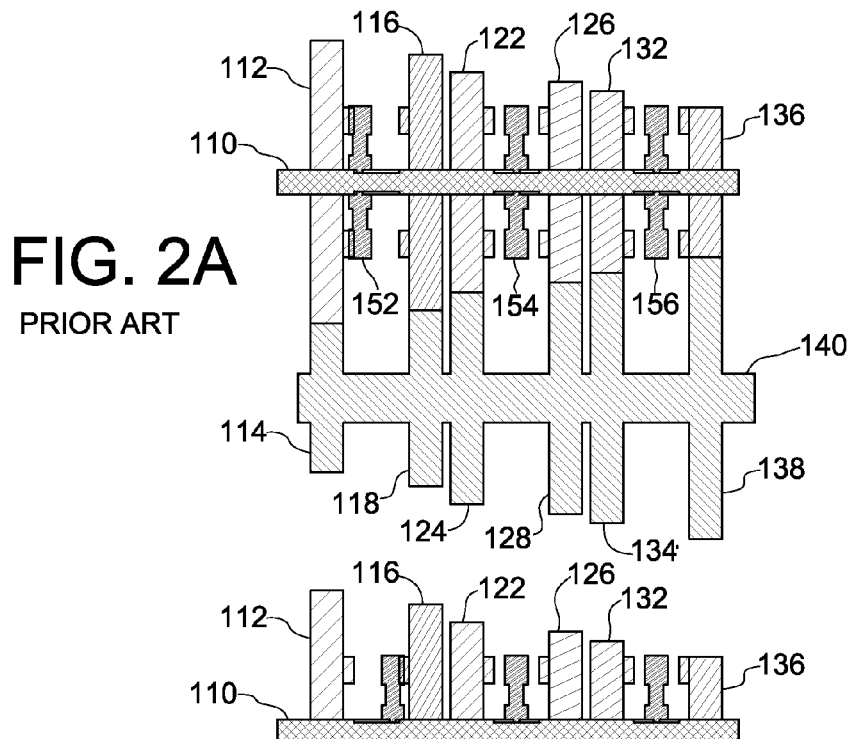
FIG. 2A
PRIOR ART
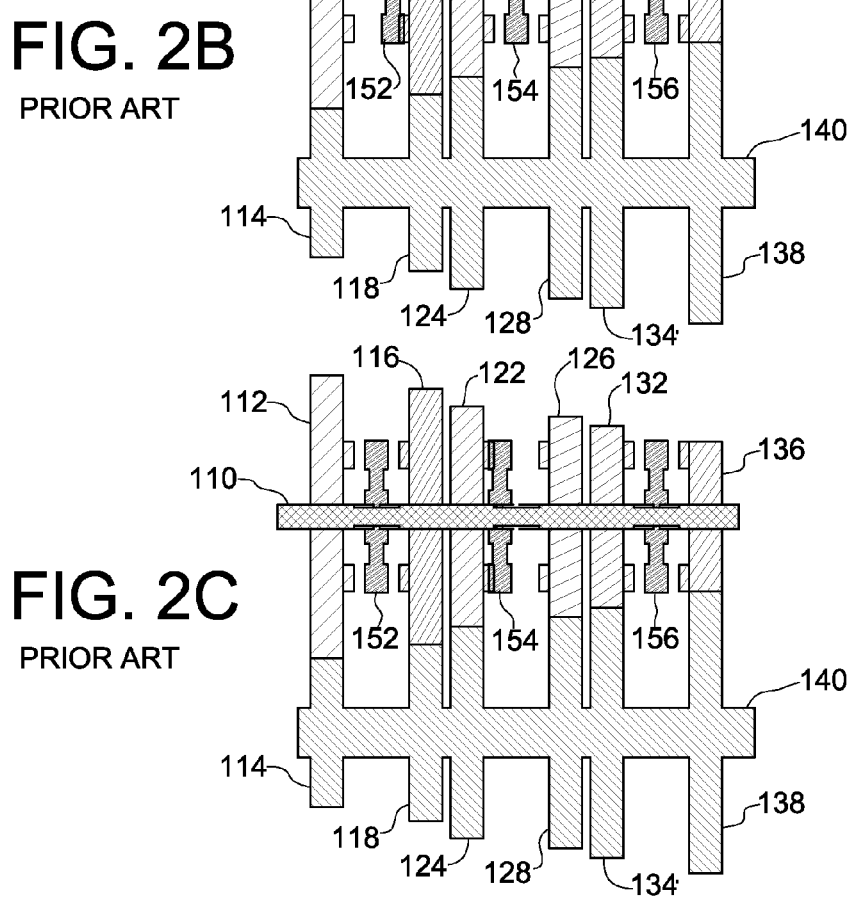
FIG. 2B
PRIOR ART
FIG. 2C
PRIOR ART

BINARY GEARBOX

FIELD OF THE INVENTION

The invention relates to gearbox transmissions for converting an input rotational speed to a selectable output rotational speed.

BACKGROUND OF THE INVENTION

It is well known that internal combustion engines operate most efficiently within a limited range of engine revolutions-per-minute (rpm). An engine with limited rpm range will require the use of many gears to enable a vehicle powered by the engine to be used over its desired speed range, which may be from standstill to the national speed limit or some other upper limit. A conventionally operated gearbox requires the vehicle driver to continually shift gears to maintain engine rpm within the optimum range. There are also available transmissions which provide a continuously variable input/output rotational speed ratio, but these are expensive to manufacture and inefficient to operate.

A conventional six-speed gearbox configuration is shown in FIG. 1 as comprising an input shaft 110 for receiving input torque. A first input gear 112 and a second input gear 116 are mounted coaxially on input shaft 110 for rotation relative to the input shaft. First input gear 112 is meshed with a first output gear 114 to form a first gear pair having a first gear ratio determined by the respective diameters or numbers of teeth of the first input gear and the first output gear. Likewise, second input gear 116 is meshed with a second output gear 118 to form a second gear pair having a second gear ratio. The first and second output gears 114 and 118 are mounted coaxially on an output shaft 140 and are fixed to output shaft 140 to rotate together therewith. A third input gear 122 and a fourth input gear 126 are mounted coaxially on input shaft 110 for rotation relative to the input shaft. Third input gear 122 is meshed with a third output gear 124 to form a third gear pair having a third gear ratio. In similar fashion, fourth input gear 126 is meshed with a fourth output gear 128 to form a fourth gear pair having a fourth gear ratio. The third and fourth output gears 124 and 128 are mounted coaxially on output shaft 140 and are fixed to the output shaft to rotate together therewith. A fifth input gear 132 and a sixth input gear 136 are also mounted coaxially on input shaft 110 so as to permit rotation relative to the input shaft. Fifth input gear 132 is meshed with a fifth output gear 134 to form a fifth gear pair having a fifth gear ratio. Likewise, sixth input gear 136 is meshed with a sixth output gear 138 to form a sixth gear pair having a sixth gear ratio. Like the first through fourth output gears, the fifth and sixth output gears 134 and 138 are mounted coaxially on output shaft 140 and are fixed to the output shaft 140 to rotate together therewith. A first selector 152 rotating with input shaft 110 is arranged movably between first gear pair 112, 114 and second gear pair 116, 118 to select either of the first and second gear pairs, a second selector 154 rotating with input shaft 110 is arranged movably between third gear pair 122, 124 and fourth gear pair 126, 128 to select either of the third and fourth gear pairs, and a third selector 156 rotating with input shaft 110 is arranged movably between fifth gear pair 132, 134 and sixth gear pair 136, 138 to select either of the fifth and sixth gear pairs.

The selector positions for the six available speeds (gears), not including neutral (already shown in FIG. 1), are illustrated in FIGS. 2A through 2F. First gear is selected by moving the first selector 152 to the left as shown in FIG. 2A to drivably engage first input gear 112, whereby the first gear ratio associated with first gear pair 112, 114 is chosen and is outputted by output shaft 140. Second gear is chosen by moving first selector 152 to the right as shown in FIG. 2B to drivably engage second input gear 116, whereby the second gear ratio associated with second gear pair 116, 118 is chosen and transmitted through output shaft 140. In similar fashion, second selector 154 is moved to the left to select third gear (FIG. 2C) and to the right to select fourth gear (FIG. 2D), and third selector 156 is moved to the left to select fifth gear (FIG. 2E) and to the right to select sixth gear (FIG. 2F). Thus, there are six gear pairs and six selectable speeds. Under a conventional configuration, two additional gear pairs and an additional selector are required to provide eight selectable speeds.

Therefore, a need exists to provide more discreet selectable speeds without adding gears and selectors to the gearbox configuration, as these bring added weight to the gearbox that is of course undesirable from the standpoint of fuel efficiency. Stated differently, a need exists to maximize the number of discreet speeds available using a given number of gear pairs and selectors.

SUMMARY OF THE INVENTION

Therefore, it is an object of the present invention to configure a gearbox such that it provides more discreet selectable speeds without adding gears and selectors to the gearbox configuration.

It is another object of the present invention to configure a gearbox that is lighter than conventional gearboxes having the same number of output speeds.

It is a further object of the present invention to configure a gearbox that is capable of providing a large range of selectable output speeds in response to input closely matching optimal engine rpm.

In furtherance of these and other objects, a gearbox of the present invention comprises a plurality of gear pairs each having a specific gear ratio, and a plurality of selectors each mounted between two gear pairs for selecting one of the two gear pairs, wherein the gear ratio of the selected gear pair is cascaded through an output shaft to another two gear pairs having another selector, and so on. In this way, the effective or aggregate gear ratio of the gearbox is the product of the gear ratios of the selected gear pairs.

A gearbox formed in accordance with an embodiment of the present invention generally comprises a plurality of gear pairs, an input shaft and a plurality of output shafts, and one selector for every two gear pairs. More particularly, an embodiment comprises six gear pairs each including a respective input gear and output gear defining a respective gear ratio. An input shaft drives a selected one of the first gear pair and the second gear pair, a first output shaft is driven by output of the selected one of the first and second gear pairs and transmits its motion to input gears of the third and fourth gear pairs, a second output shaft is driven by output of a selected one of the third and fourth gear pairs and transmits its motion to input gears of the fifth and sixth gear pairs, and a third output shaft is driven by output of a selected one of the fifth and sixth gear pairs. Three selectors are respectively arranged between the first and second gear pairs, the third and fourth gear pairs, and the fifth and sixth gear pairs, wherein each selector is movable to select one of the two gear pairs it is between by engagement with the selected gear pair. The total number of output speeds (excluding neutral) available to the third output shaft is given by $2^n$ where n=(number of gear pairs)/2. Thus, with six gear pairs, there are $2^3=8$ available speeds.

The cascading gearbox configuration may be extended to include additional gear pairs. With eight gear pairs, the total number of available output speeds increase exponentially to 16.

BRIEF DESCRIPTION OF THE DRAWINGS

The nature and mode of operation of the present invention will now be more fully described in the following detailed description of various embodiments taken with the accompanying drawing figures, in which:

FIG. 2A shows the conventional six-speed gearbox of the prior art, in first gear;

FIG. 2B shows the conventional six-speed gearbox of the prior art, in second gear;

FIG. 2C shows the conventional six-speed gearbox of the prior art, in third gear;

DETAILED DESCRIPTION OF THE INVENTION

Figure 1:
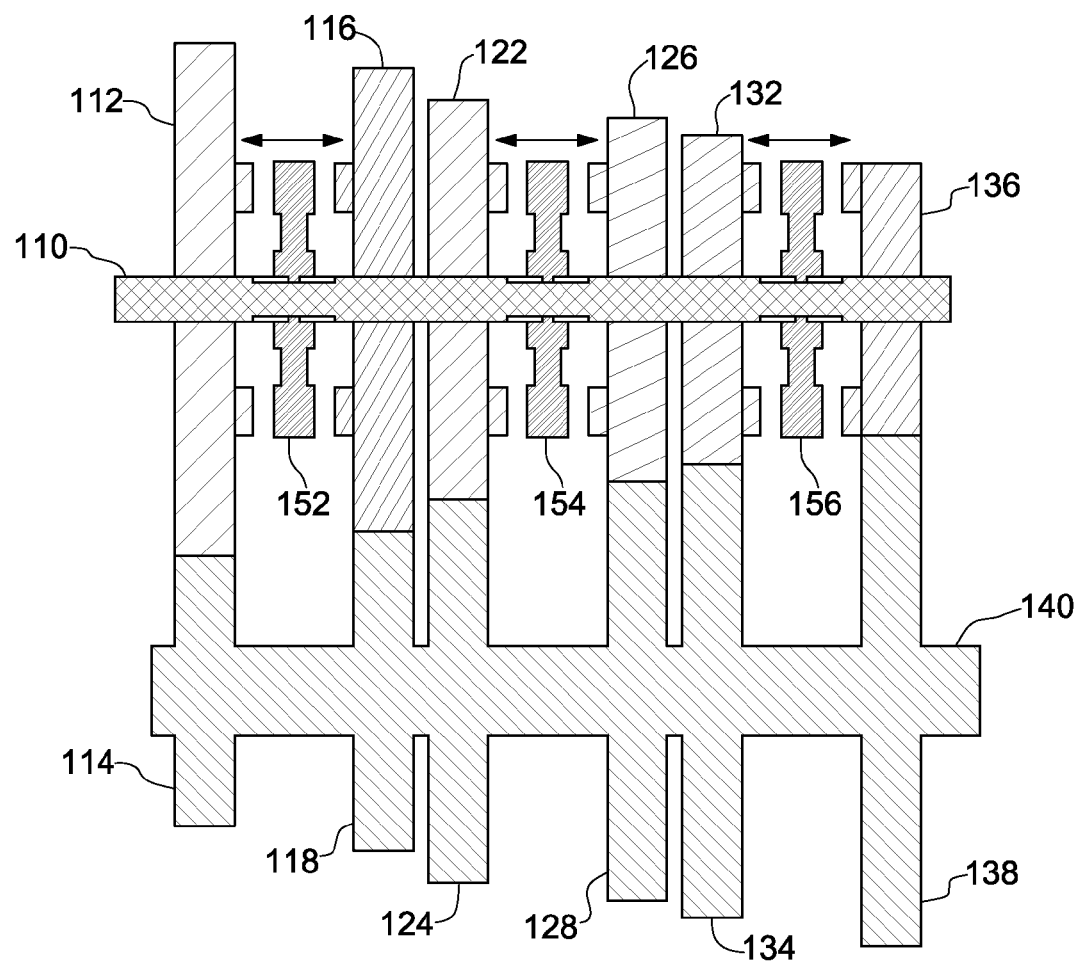
FIG. 1 shows a conventional six-speed gearbox of the prior art, in neutral.
Figure 2D:
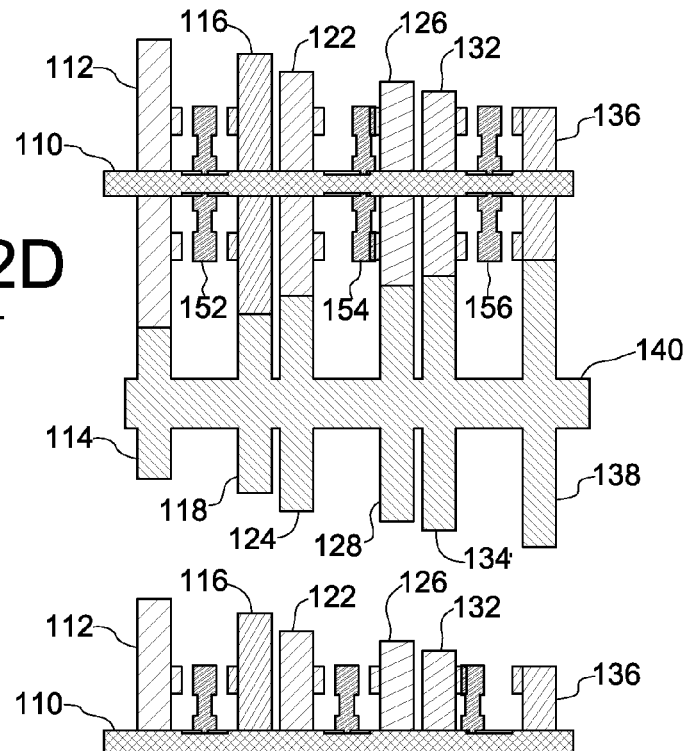
FIG. 2D shows the conventional six-speed gearbox of the prior art, in fourth gear.
Figure 2E:
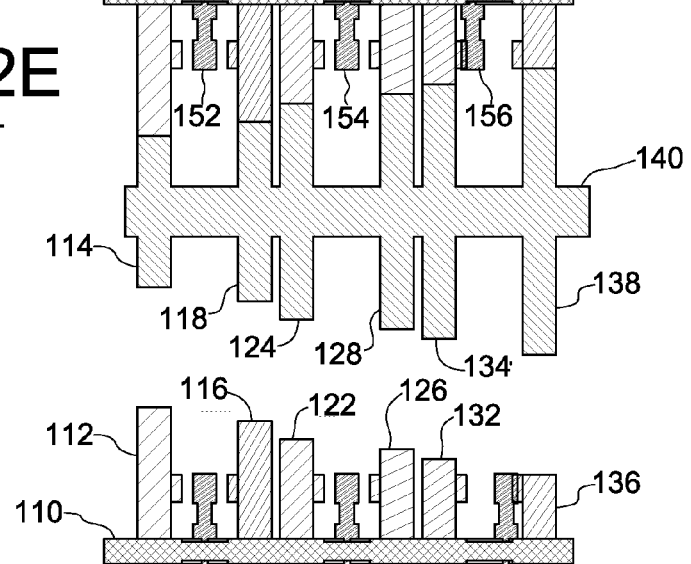
FIG. 2E shows the conventional six-speed gearbox of the prior art, in fifth gear.
Figure 2F:
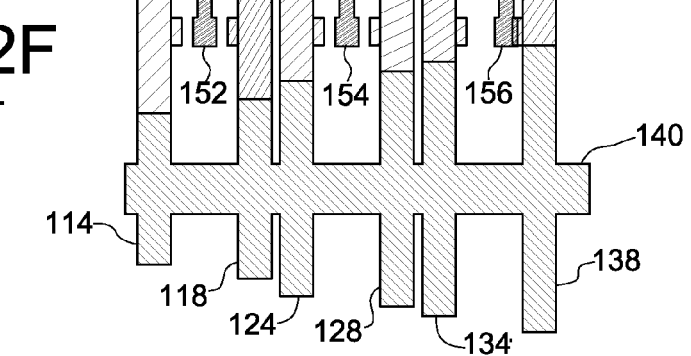
FIG. 2F shows the conventional six-speed gearbox of the prior art, in sixth gear.
Figure 3:
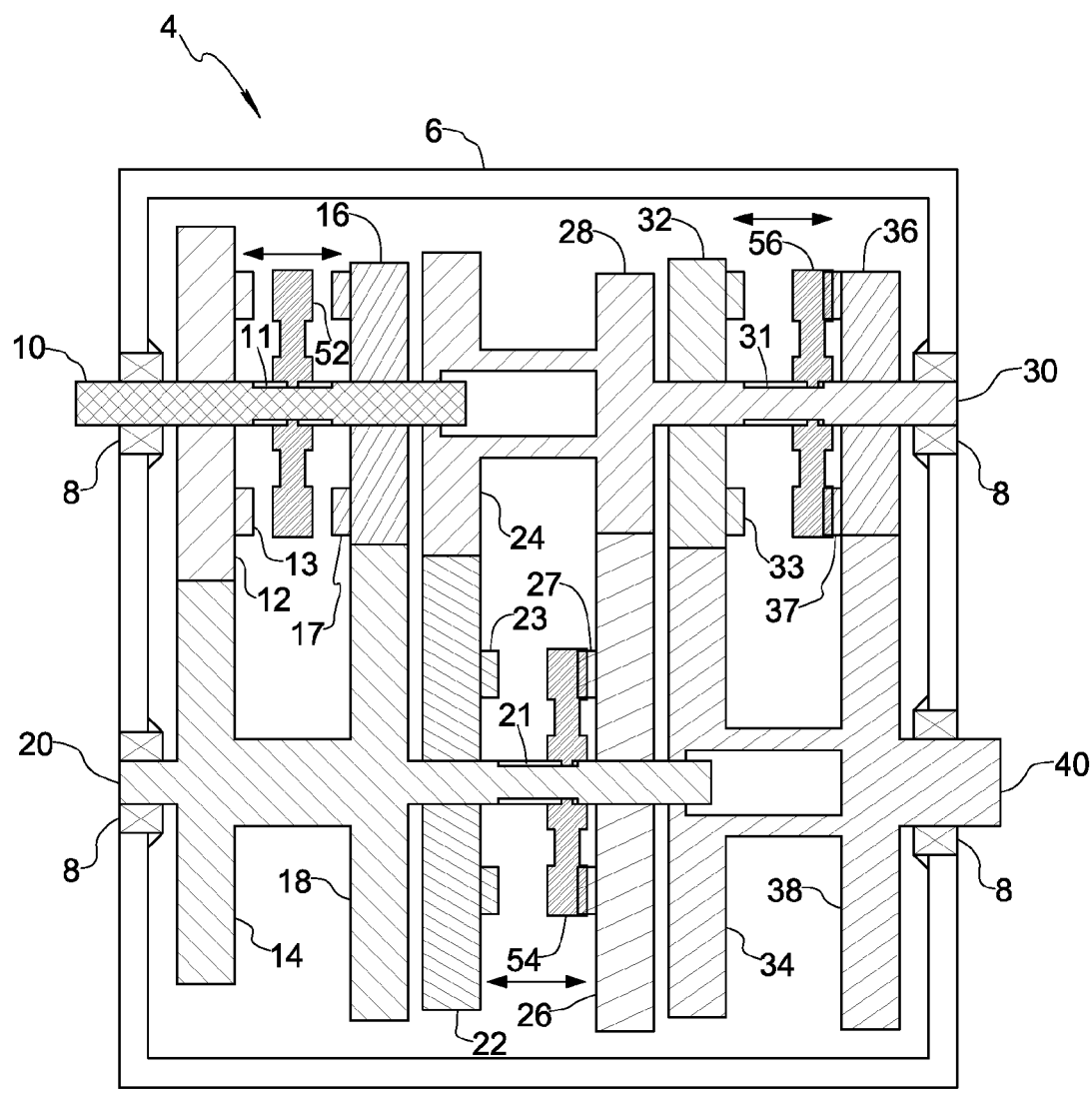
FIG. 3 shows a binary gearbox formed in accordance with a first embodiment of the present invention, in neutral.

FIG. 3 schematically illustrates a binary gearbox 4 formed in accordance with a first embodiment of the present invention. Gearbox 4 includes a housing 6 having bearings 8 for rotatably supporting elements of a variable speed drive mechanism of the gearbox.

Gearbox 4 comprises an input shaft 10 for receiving input torque, such as torque from a motor drive. A first input gear 12 and a second input gear 16 are mounted coaxially on input shaft 10 for rotation relative to the input shaft. First input gear 12 is meshed with a first output gear 14 to form a first gear pair having a first gear ratio determined by the respective diameters (or respective numbers of teeth) of the first input gear and the first output gear. Likewise, second input gear 16 is meshed with a second output gear 18 to form a second gear pair having a second gear ratio. The first and second output gears 14 and 18 are mounted coaxially on a first output shaft 20 and are fixed to first output shaft 20 to rotate together therewith.

A third input gear 22 and a fourth input gear 26 are mounted coaxially on first output shaft 20 for rotation relative to first output shaft 20. Third input gear 22 is meshed with a third output gear 24 to form a third gear pair having a third gear ratio. In similar fashion, fourth input gear 26 is meshed with a fourth output gear 28 to form a fourth gear pair having a fourth gear ratio. The third and fourth output gears 24 and 28 are mounted coaxially on a second output shaft 30 and are fixed to second output shaft 30 to rotate together therewith. Second output shaft 30 is coaxially aligned with input shaft 10 but rotates relative to the input shaft.

Also mounted coaxially on second output shaft 30 are a fifth input gear 32 and a sixth input gear 36. Fifth and sixth input gears 32 and 36 are mounted so as to permit rotation relative to second output shaft 30. Fifth input gear 32 is meshed with a fifth output gear 34 to form a fifth gear pair having a fifth gear ratio. Likewise, sixth input gear 36 is meshed with a sixth output gear 38 to form a sixth gear pair having a sixth gear ratio. The fifth and sixth output gears 34 and 38 are mounted coaxially on a third output shaft 40 and are fixed to third output shaft 40 to rotate together therewith. Third output shaft 40 is coaxially aligned with first output shaft 20 but rotates relative to the first output shaft.

Gearbox 4 further comprises a first selector 52 arranged movably between first gear pair 12, 14 and second gear pair 16, 18 to select either of the first and second gear pairs, a second selector 54 arranged movably between third gear pair 22, 24 and fourth gear pair 26, 28 to select either of the third and fourth gear pairs, and a third selector 56 arranged movably between fifth gear pair 32, 34 and sixth gear pair 36, 38 to select either of the fifth and sixth gear pairs. Selectors 52, 54, and 56 may be moved by any of a variety of actuation mechanisms known in the art, including without limitation mechanical drum actuators, pneumatic actuators, hydraulic actuators, and electromechanical actuators. The type of actuation mechanism used will depend upon the particular application of gearbox 4, and is not considered part of the present invention.

In the embodiment shown in FIG. 3, first selector 52 is mounted on input shaft 10 for axial movement therealong to select either first gear pair 12, 14 by engagement with a coupling 13 fixed to first input gear 12, or second gear pair 16, 18 by engagement with a coupling 17 fixed to second input gear 16. A travel slot 11 is indicated schematically along input shaft 10 for first selector 52, it being understood that first selector 52 is mounted on input shaft 10 to rotate together with the input shaft and move axially along the input shaft. Accordingly, when first selector 52 is engaged with coupling 13, the first input gear 12 is coupled to input shaft 10 to rotate together with the input shaft such that torque is transmitted from the input shaft to first gear pair 12, 14. Alternatively, when first selector 52 is engaged with coupling 17, the second input gear 16 is coupled to input shaft 10 to rotate together with the input shaft such that torque is transmitted from the input shaft to second gear pair 16, 18. First selector 52 may also occupy a neutral position in which it is between and disengaged from couplings 13 and 17 as depicted in FIG. 3, such that torque from input shaft 10 is not transmitted to either first gear pair 12, 14 or second gear pair 16, 18.

FIG. 3 shows second selector 54 mounted on first output shaft 20 for axial movement therealong to select either third gear pair 22, 24 by engagement with a coupling 23 fixed to third input gear 22, or fourth gear pair 26, 28 by engagement with a coupling 27 fixed to fourth input gear 26. A travel slot 21 is indicated schematically along first output shaft 20 for second selector 54, which is mounted on first output shaft 20 to rotate together with the first output shaft and move axially along the first output shaft. Thus, when second selector 54 is engaged with coupling 23, the third input gear 22 is coupled to first output shaft 20 to rotate together with the first output shaft such that torque is transmitted from the first output shaft to third gear pair 22, 24. Alternatively, when second selector 54 is engaged with coupling 27 as depicted in FIG. 3, the fourth input gear 26 is coupled to first output shaft 20 to rotate together with the first output shaft such that torque (if any) is transmitted from the first output shaft to fourth gear pair 26, 28. Second selector 54 may also occupy a neutral position in which it is between and disengaged from couplings 23 and 27 to prevent torque transmission from first output shaft 20 to either third gear pair 22, 24 or fourth gear pair 26, 28.

With continued reference to FIG. 3, it can be seen that third selector 56 is mounted on second output shaft 30 for axial movement therealong to select either fifth gear pair 32, 34 by engagement with a coupling 33 fixed to fifth input gear 32, or sixth gear pair 36, 38 by engagement with a coupling 37 fixed to sixth input gear 36. A travel slot 31 is schematically drawn along second output shaft 30 for third selector 56, which is mounted on second output shaft 30 to rotate together therewith and move axially therealong. Thus, when third selector 56 is engaged with coupling 33, the fifth input gear 32 is coupled to second output shaft 30 to rotate together with the second output shaft to transmit torque from the second output shaft to fifth gear pair 32, 34. When third selector 56 is engaged with coupling 37 as depicted in FIG. 3, the sixth input gear 36 is coupled to second output shaft 30 to rotate together with the second output shaft to transmit torque (if any) from the second output shaft to sixth gear pair 36, 38. Third selector 56 may also occupy a neutral position in which it is between and disengaged from couplings 33 and 37 to prevent torque transmission from second output shaft 30 to either fifth gear pair 32, 34 or sixth gear pair 36, 38.

The gearbox configuration shown in FIG. 3 provides eight selectable speeds or "gears," as well as a neutral setting. The eight gears are shown in FIGS. 4A through 4H, respectively. First gear, shown in FIG. 4A, corresponds to a condition wherein first selector 52 engages first gear pair 12, 14, second selector 54 engages third gear pair 22, 24, and third selector 56 engages fifth gear pair 32, 34. In this condition, rotational motion is transmitted from input shaft 10 to first input gear 12, from first input gear 12 to first output gear 14, from first output gear 14 to first output shaft 20, from first output shaft 20 to third input gear 22, from third input gear 22 to third output gear 24, from third output gear 24 to second output shaft 30, from second output shaft 30 to fifth input gear 32, from fifth input gear 32 to fifth output gear 34, and from fifth output gear 34 to third output shaft 40. As will be understood, the ratio of rotational speed of input shaft 10 to that of third output shaft 40 is given by:

$$\frac{\text{\# Teeth-}1^{st}\text{ Input Gear}}{\text{\# Teeth-}1^{st}\text{ Output Gear}} \times$$

$$\frac{\text{\# Teeth, }3^{rd}\text{ Input Gear}}{\text{\# Teeth, }3^{rd}\text{ Output Gear}} \times \frac{\text{\# Teeth, }5^{th}\text{ Input Gear}}{\text{\# Teeth, }5^{th}\text{ Output Gear}}$$

which is the product of the gear ratios of the selected gear pairs. In this regard, the first, second, and third selectors 52, 54, and 56 can be thought of as having binary engagement settings. First selector 52 can engage first gear pair 12, 14 (binary "0" setting) or second gear pair 16, 18 (binary "1" setting). Likewise, second selector 54 has a "0" setting in engagement with third gear pair 22, 24 and a "1" setting in engagement with fourth gear pair 26, 28. Finally, third selector 56 has a "0" setting in engagement with fifth gear pair 32, 34 and a "1" setting in engagement with sixth gear pair 36, 38. Accordingly, the first gear condition shown in FIG. 4A may be referred to as a "000" setting of the gearbox. Thus, the total number of available speeds or gears is given by $2^n$ where n=(number of gear pairs)/2.

Figure 4A:
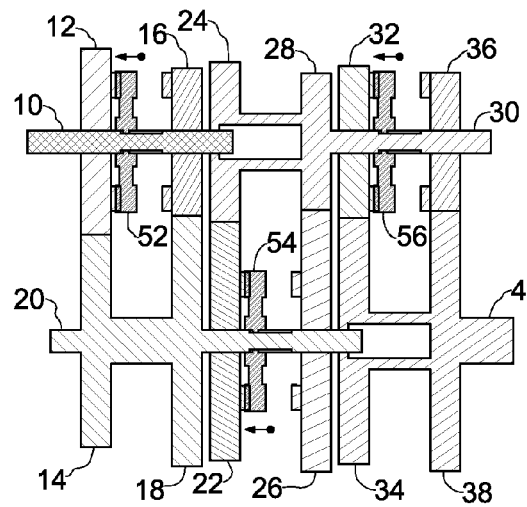
FIG. 4A shows the binary gearbox of FIG. 3, in first gear.
Figure 4B:
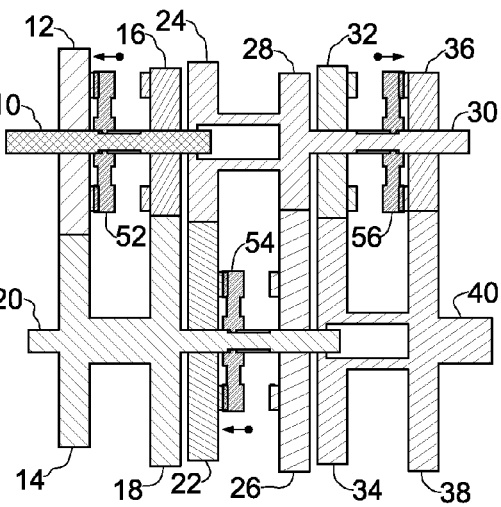
FIG. 4B shows the binary gearbox of FIG. 3, in second gear.
Figure 4C:
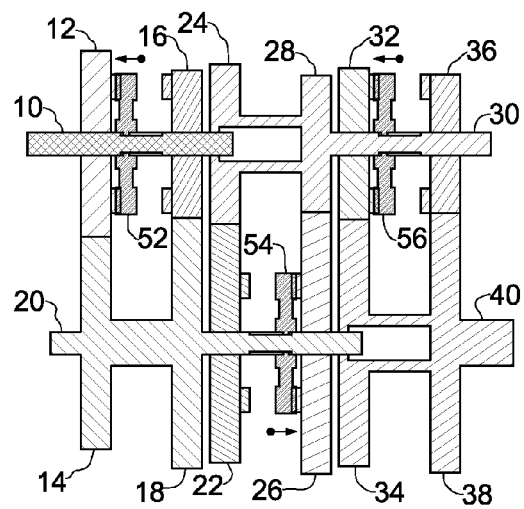
FIG. 4C shows the binary gearbox of FIG. 3, in third gear.
Figure 4D:
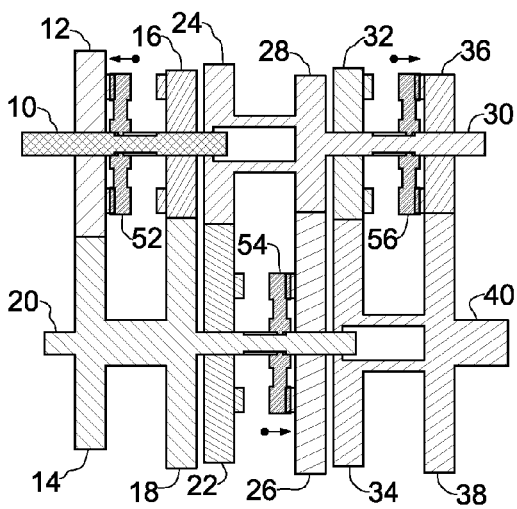
FIG. 4D shows the binary gearbox of FIG. 3, in fourth gear.
Figure 4E:
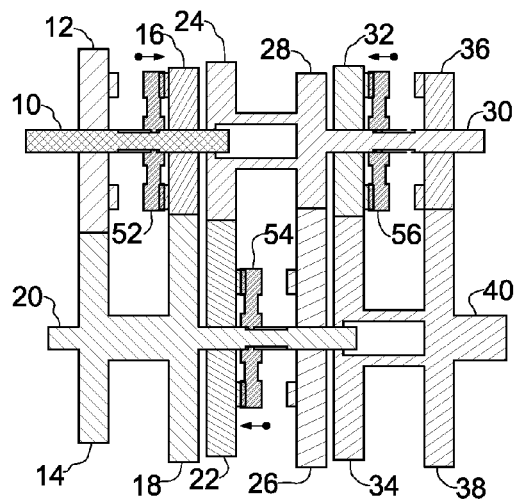
FIG. 4E shows the binary gearbox of FIG. 3, in fifth gear.
Figure 4F:
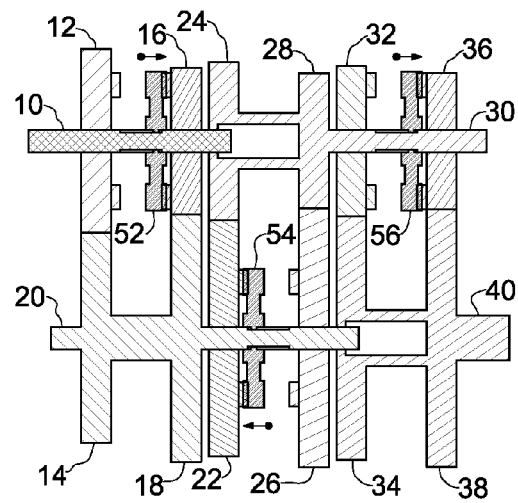
FIG. 4F shows the binary gearbox of FIG. 3, in sixth gear.
Figure 4G:
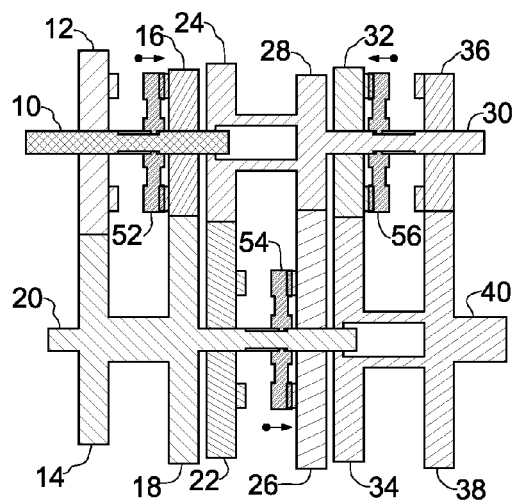
FIG. 4G shows the binary gearbox of FIG. 3, in seventh gear.
Figure 4H:
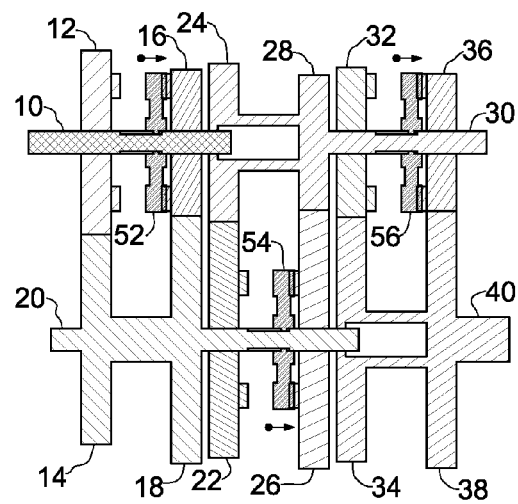
FIG. 4H shows the binary gearbox of FIG. 3, in eighth gear.

FIG. 4B illustrates gearbox in second gear, or "001". In this condition, the overall rotational speed ratio of input shaft 10 to third output shaft 40 the first gear ratio, the third gear ratio, and the sixth gear ratio. FIGS. 4C through 4H show the selector positions when gearbox 4 is in third gear through eighth gear. Merely by way of example, and not by limitation, the following gear ratios may be assumed for sake of illustration:

| GEAR PAIR | GEAR RATIO | DESIGNATION | DECIMAL VALUE |
|---|---|---|---|
| First (12, 14) | 33:21 | R1 | 1.57143 |
| Second (16, 18) | 21:33 | R2 | 0.63636 |
| Third (22, 24) | 30:24 | R3 | 1.25000 |
| Fourth (26, 28) | 24:30 | R4 | 0.80000 |
| Fifth (32, 34) | 28:25 | R5 | 1.12000 |
| Sixth (36, 38) | 25:28 | R6 | 0.89286 |

The table below shows computation of the ratio of input shaft rotational speed to third output shaft rotational speed for each of the eight gear speeds available in the depicted embodiment, assuming the example gear ratios listed above.

| GEAR (SPEED) | FIG. | BINARY | PRODUCT | I/O RATIO |
|---|---|---|---|---|
| 1 | 4A | 000 | R1 × R3 × R5 | 2.2:1 |
| 2 | 4B | 001 | R1 × R3 × R6 | 1.75:1 |
| 3 | 4C | 010 | R1 × R4 × R5 | 1.408:1 |
| 4 | 4D | 011 | R1 × R4 × R6 | 1.122:1 |
| 5 | 4E | 100 | R2 × R3 × R5 | 0.8909:1 |
| 6 | 4F | 101 | R2 × R3 × R6 | 0.71023:1 |
| 7 | 4G | 110 | R2 × R4 × R5 | 0.5702:1 |
| 8 | 4H | 111 | R2 × R4 × R6 | 0.4545:1 | wherein R1 through R6 are the gear ratios of the respective first through sixth gear pairs.

Figure 5:
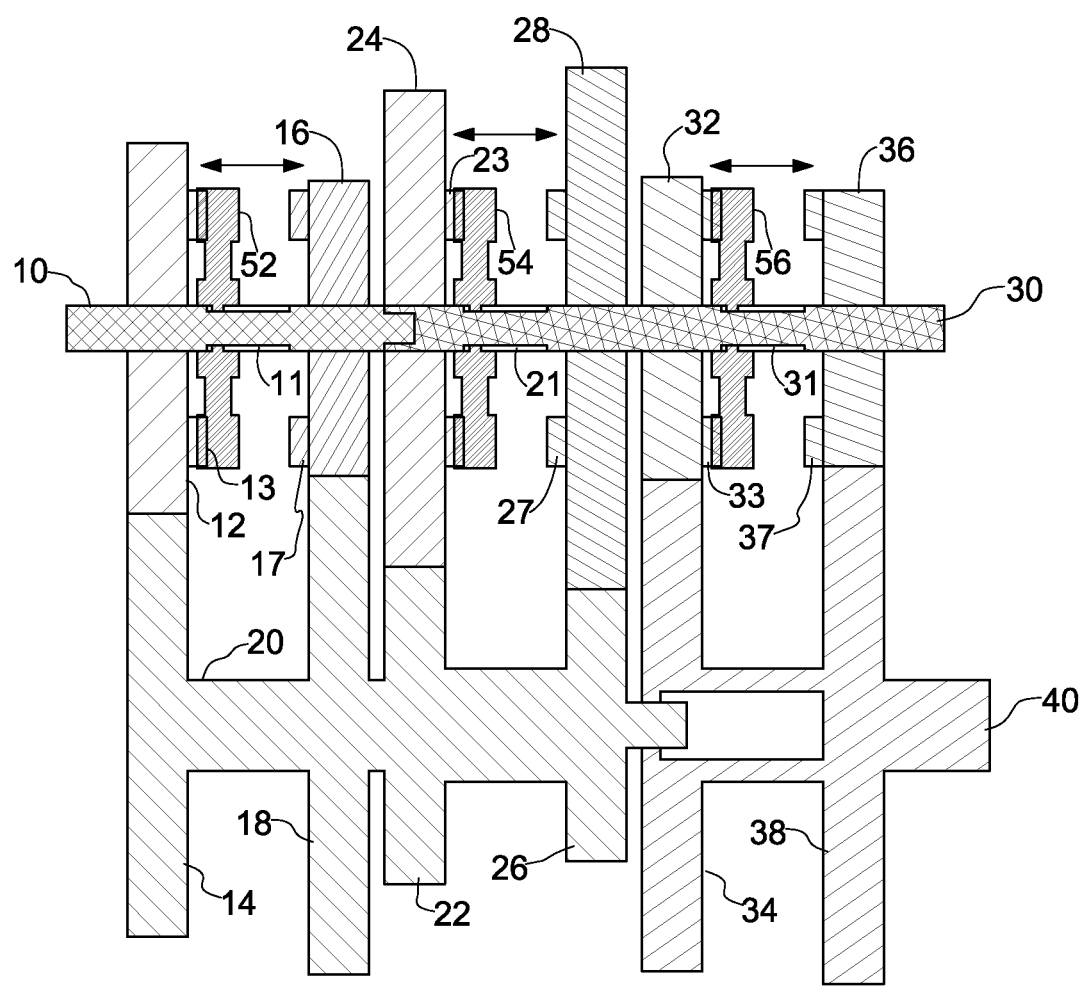
FIG. 5 shows a binary gearbox configuration formed in accordance with a second embodiment of the present invention, wherein three selectors of the gearbox configuration are aligned along a common axis.

FIG. 5 shows a gearbox configuration according to a second embodiment of the present invention. In this embodiment, third input gear 22 and fourth input gear 26 are fixed to first output shaft 20 to rotate together therewith, while third output gear 24 and fourth output gear 28 are mounted on second output shaft 30 in a manner permitting relative rotation between the mounted output gears 24, 28 and the second output shaft 30. Second selector 54 is mounted on second output shaft 30 for axial movement therealong to select either third gear pair 22, 24 by engagement with coupling 23 now fixed to third output gear 24 or fourth gear pair 26, 28 by engagement with coupling 27 now fixed to fourth output gear 26. Travel slot 21 is now indicated schematically along second output shaft 30. Second selector 54 rotates together with second output shaft 30. In other respects, the second embodiment is generally similar to the first embodiment of FIG. 3. As is readily apparent from FIG. 5, all three selectors 52, 54, and 56 are aligned along a common axis in this embodiment.

Figure 6:
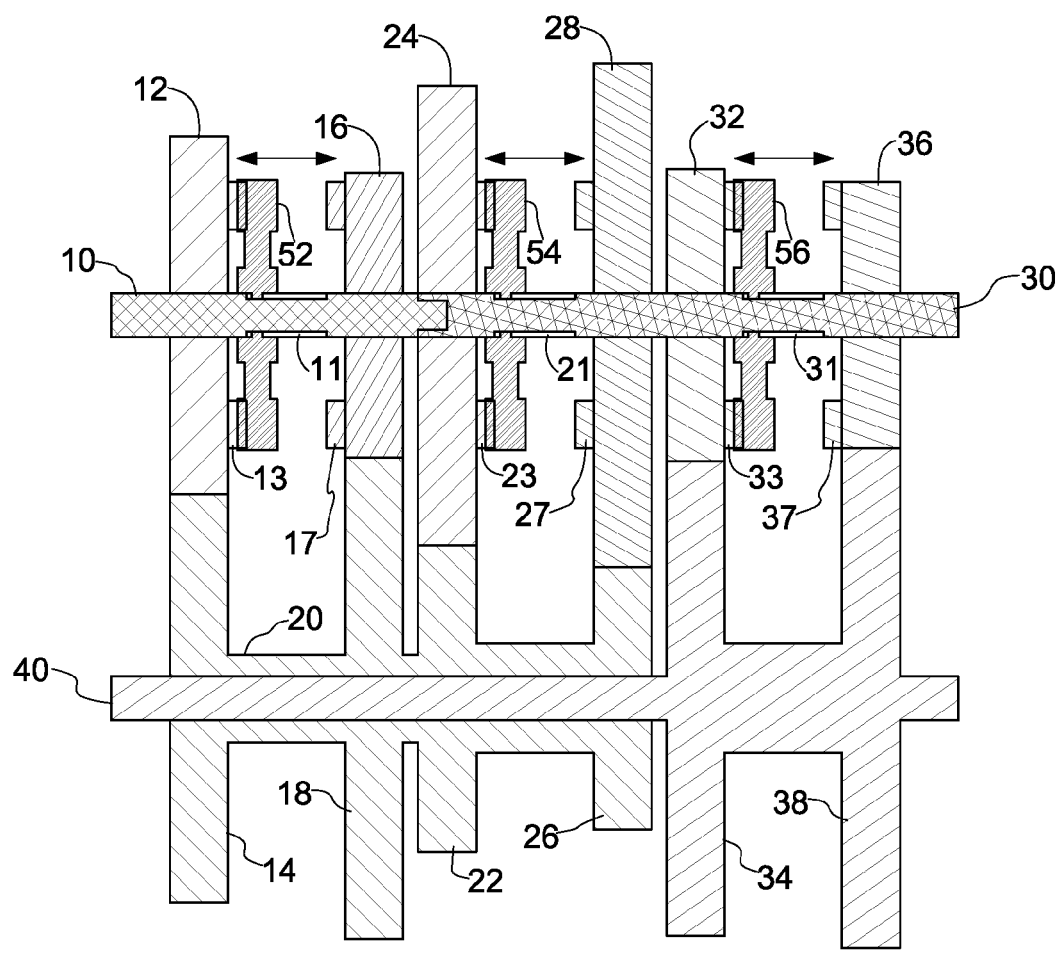
FIG. 6 shows a binary gearbox configuration formed in accordance with a third embodiment of the present invention, wherein three selectors of the gearbox configuration are aligned along a common axis, and the input and final output shaft of the gearbox configuration are on the same end of the configuration.

FIG. 6 shows a gearbox configuration according to a third embodiment of the present invention that is substantially similar to the embodiment shown in FIG. 5, except that third output shaft 40 is arranged to extend through a central bore in first output shaft 20, whereby an output end of third output shaft 40 is located on the same side of the gearbox as an input end of input shaft 10.

Figure 7:
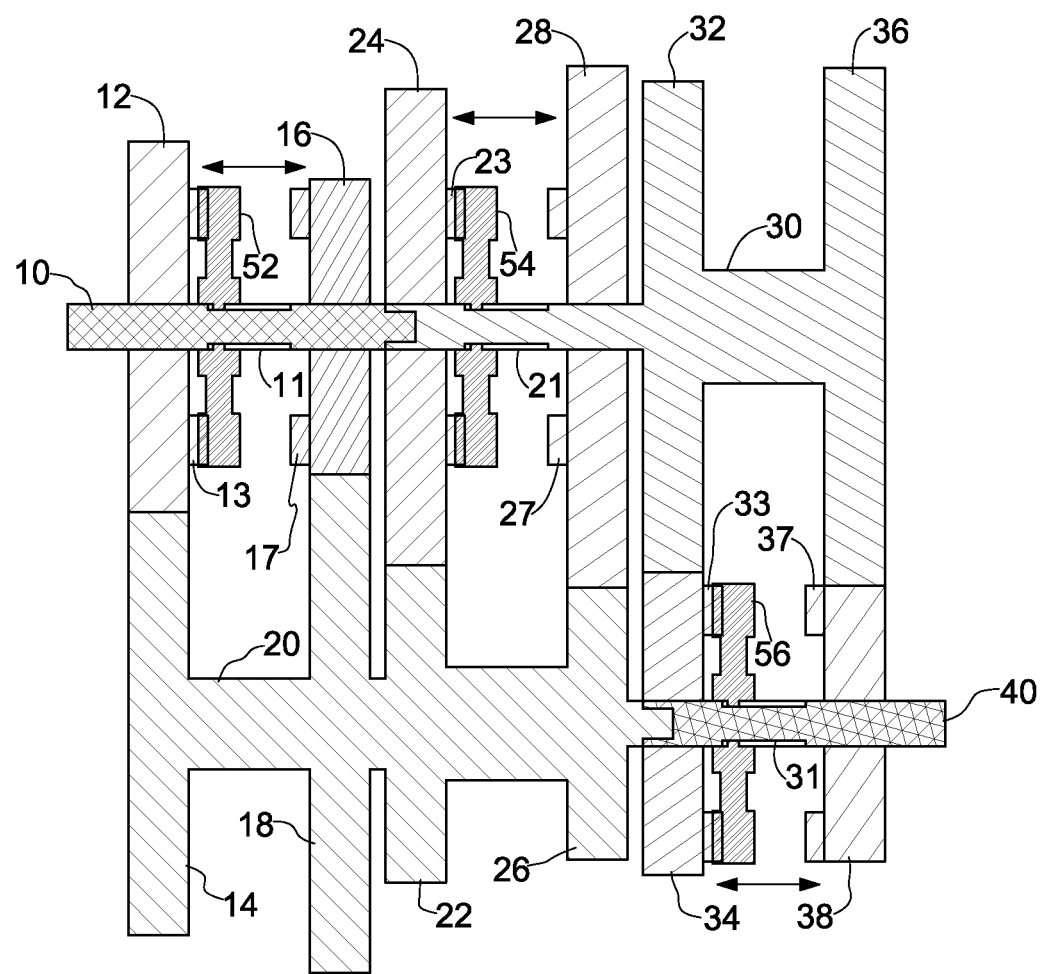
FIG. 7 shows a binary gearbox configuration formed in accordance with a fourth embodiment of the present invention, wherein a selector of the gearbox configuration is aligned on an axis of a final output shaft of the configuration.

A gearbox configuration formed in accordance with a fourth embodiment of the present invention is shown in FIG. 7. The fourth embodiment is generally similar to the embodiment shown in FIG. 5, except that fifth input gear 32 and sixth input gear 36 are fixed to second output shaft 30, and third selector 56 is mounted on third output shaft 40 so as to rotate together therewith. In this configurations travel slot 31 is now indicated schematically along third output shaft 40 to allow third selector 56 to move axially to select either fifth gear pair 32, 34 by engagement with coupling 33 now fixed to fifth output gear 34 or sixth gear pair 36, 38 by engagement with coupling 37 now fixed to sixth output gear 36.

Figure 8:
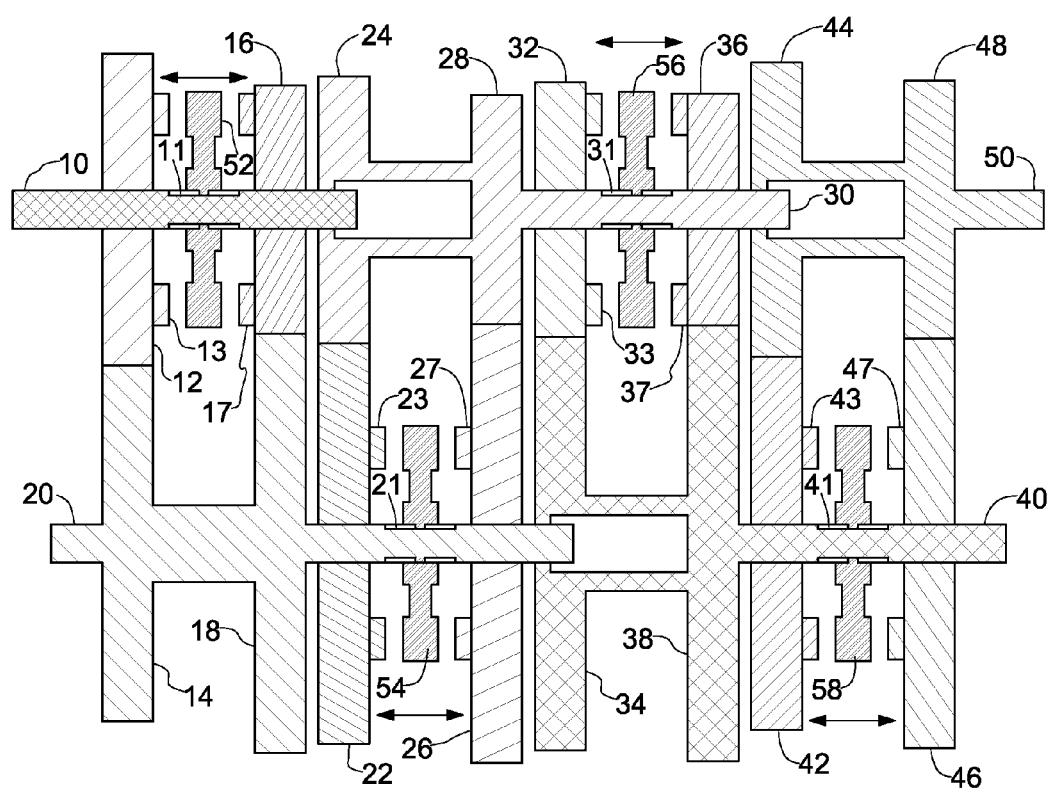
FIG. 8 shows a binary gearbox configuration formed in accordance with a fifth embodiment of the present invention, wherein eight gear pairs are provided.

As will be appreciated, the embodiments of FIGS. 5 through 7 offer eight speeds or gears in a manner similar to the embodiment of FIG. 3 by utilizing a cascading arrangement of gears and shafts. This principle may be extended by adding additional gear pairs and an associated selector, as illustrated by a fifth embodiment shown in FIG. 8. The fifth embodiment is similar to the first embodiment of FIG. 3, except that it includes two additional gear pairs and one additional selector. In particular, a seventh gear pair defining a seventh gear ratio includes a seventh input gear 42 and a seventh output gear 44, and an eighth gear pair defining an eighth gear ratio includes an eighth input gear 46 and an eighth output gear 48. The seventh and eighth input gears 42 and 46 are mounted on third output shaft 40 to allow relative rotation between the mounted input gears 42, 46 and the third output shaft 40. A fourth selector 58 is mounted on third output shaft 40 to be movable along a travel slot 41 in the third output shaft and to rotate with the third output shaft. Fourth selector 58 can be moved to select seventh gear pair 42, 44 by engagement with a coupling 43 fixed to seventh input gear 42 or eighth gear pair 46, 48 by engagement with a coupling 47 fixed to eighth input gear 46. Seventh and eighth output gears 44 and 48 are fixed to a fourth output shaft 50, which provides the final output motion in the present configuration. The configuration of FIG. 8 provides a total of $2^4=16$ different speeds or gears.

From the foregoing description, it will be understood that a cascading binary gearbox of the present invention uses multiple fixed gear ratios in a novel way that provides more discreet input/output speed ratios than conventional gearboxes. The novel gearbox is applicable to internal combustion engines, and allows an engine to operate within its optimum rpm range to increase fuel efficiency. As a result, the invention is expected to aid in the development of light-weight, fuel-efficient motor vehicles.

| PARTS LIST | |
|---|---|
| 4 | Gearbox |
| 6 | Housing |
| 8 | Bearing |
| 10 | Input shaft |
| 11 | Travel slot for first selector |
| 12 | First input gear |
| 13 | Coupling |
| 14 | First output gear |
| 16 | Second input gear |
| 17 | Coupling |
| 18 | Second output gear |
| 20 | First output shaft |
| 21 | Travel slot for second selector |
| 22 | Third input gear |
| 23 | Coupling |
| 24 | Third output gear |
| 26 | Fourth input gear |
| 27 | Coupling |
| 28 | Fourth output gear |
| 30 | Second output shaft |
| 31 | Travel slot for third selector |
| 32 | Fifth input gear |
| 33 | Coupling |
| 34 | Fifth output gear |
| 36 | Sixth input gear |
| 37 | Coupling |
| 38 | Sixth output gear |
| 40 | Third output shaft |
| 41 | Travel slot for fourth selector |
| 42 | Seventh input gear |
| 43 | Coupling |
| 44 | Seventh output gear |
| 46 | Eighth input gear |
| 47 | Coupling |
| 48 | Eighth output gear |
| 50 | Fourth output shaft |
| 52 | First selector |
| 54 | Second selector |
| 56 | Third selector |
| 58 | Fourth selector |

What is claimed is:

1. A gearbox comprising:
   a first gear pair including an input gear and an output gear meshed to define a first gear ratio;
   a second gear pair including an input gear and an output gear meshed to define a second gear ratio;
   a third gear pair including an input gear and an output gear meshed to define a third gear ratio;
   a fourth gear pair including an input gear and an output gear meshed to define a fourth gear ratio;
   a fifth gear pair including an input gear and an output gear meshed to define a fifth gear ratio;
   a sixth gear pair including an input gear and an output gear meshed to define a sixth gear ratio;
   an input shaft rotatable about an axis of rotation for driving a selected one of the first gear pair and the second gear pair;
   a first output shaft for being driven by output of a selected one of the first gear pair and the second gear pair;
   a second output shaft for being driven by output of a selected one of the third gear pair and the fourth gear pair;
   a third output shaft for being driven by output of a selected one of the fifth gear pair and the sixth gear pair;
   a first selector arranged between the first gear pair and the second gear pair, the first selector being movable to select either of the first and second gear pairs by engagement therewith;

a second selector arranged between the third gear pair and the fourth gear pair, the second selector being movable to select either of the third and fourth gear pairs by engagement therewith; and a third selector arranged between the fifth gear pair and the sixth gear pair, the third selector being movable to select either of the fifth and sixth gear pairs by engagement therewith;

wherein a ratio of rotational speed between the input shaft and the third output shaft is a product of at least three gear ratios respectively selected by the first selector, the second selector, and the third selector;

wherein the first gear pair, the second gear pair, the third gear pair, the fourth gear pair, the fifth gear pair, and the sixth gear pair output in a single direction and have a binary relationship such that a total number of gear ratios from gear pairs in the single direction is represented by $2^{n/2}$, where n equals a total number of the gear pairs in the single direction.

2. The gearbox according to claim 1, wherein the input gear of the first gear pair and the input gear of the second gear pair are each mounted on the input shaft for rotation relative to the input shaft, and the first selector is mounted on the input shaft for rotation with the input shaft and axially directed sliding motion along the input shaft to engage either the input gear of the first gear pair or the input gear of the second gear pair.

3. The gearbox according to claim 2, wherein the output gear of the first gear pair and the output gear of the second gear pair are each mounted on the first output shaft for rotation with the first output shaft.

4. The gearbox according to claim 3, wherein the input gear of the third gear pair and the input gear of the fourth gear pair are each mounted on the first output shaft for rotation relative to the first output shaft, and the second selector is mounted on the first output shaft for rotation with the first output shaft and axially directed sliding motion along the first output shaft to engage either the input gear of the third gear pair or the input gear of the fourth gear pair.

5. The gearbox according to claim 4, wherein the output gear of the third gear pair and the output gear of the fourth gear pair are each mounted on the second output shaft for rotation with the second output shaft.

6. The gearbox according to claim 5, wherein the input gear of the fifth gear pair and the input gear of the sixth gear pair are each mounted on the second output shaft for rotation relative to the second output shaft, and the third selector is mounted on the second output shaft for rotation with the second output shaft and axially directed sliding motion along the second output shaft to engage either the input gear of the fifth gear pair or the input gear of the sixth gear pair.

7. The gearbox according to claim 6, wherein the output gear of the fifth gear pair and the output gear of the sixth gear pair are each mounted on the third output shaft for rotation with the third output shaft.

8. The gearbox according to claim 3, wherein the input gear of the third gear pair and the input gear of the fourth gear pair are each mounted on the first output shaft for rotation with the first output shaft.

9. The gearbox according to claim 8, wherein the output gear of the third gear pair and the output gear of the fourth gear pair are each mounted on the second output shaft for rotation relative to the second output shaft, and the second selector is mounted on the second output shaft for rotation with the second output shaft and axially directed sliding motion along the second output shaft to engage either the output gear of the third gear pair or the output gear of the fourth gear pair.

10. The gearbox according to claim 9, wherein the input gear of the fifth gear pair and the input gear of the sixth gear pair are each mounted on the second output shaft for rotation relative to the second output shaft, and the third selector is mounted on the second output shaft for rotation with the second output shaft and axially directed sliding motion along the second output shaft to engage either the input gear of the fifth gear pair or the input gear of the sixth gear pair.

11. The gearbox according to claim 10, wherein the output gear of the fifth gear pair and the output gear of the sixth gear pair are each mounted on the third output shaft for rotation with the third output shaft.

12. The gearbox according to claim 9, wherein the input gear of the fifth gear pair and the input gear of the sixth gear pair are each mounted on the second output shaft for rotation with the second output shaft.

13. The gearbox according to claim 12, wherein the output gear of the fifth gear pair and the output gear of the sixth gear pair are each mounted on the third output shaft for rotation relative to the third output shaft, and the third selector is mounted on the third output shaft for rotation with the third output shaft and axially directed sliding motion along the third output shaft to engage either the output gear of the fifth gear pair or the output gear of the sixth gear pair.

14. The gearbox according to claim 1, wherein the input shaft is coaxial with the second output shaft.

15. The gearbox according to claim 1, wherein the first output shaft is coaxial with the third output shaft.

16. The gearbox according to claim 1, wherein an input end of the input shaft and an output end of the third output shaft are on the same side of the gearbox.

17. The gearbox according to claim 1, wherein at least one of the first selector, the second selector, and the third selector is movable to a neutral position wherein the selector does not engage a gear pair.

18. A gearbox comprising:
a plurality of gear pairs, each gear pair including an input gear and an output gear meshed to define a gear ratio;
an input shaft for driving the input gear of one of the plurality of gear pairs;
a plurality of selectors, each of the plurality of selectors being movable to select either one of two gear pairs in the plurality of gear pairs by engagement therewith, one of the plurality of selectors transmitting rotational motion from the input shaft to a selected gear pair; and
a plurality of output shafts independently rotatable with respect to one another, each of the plurality of output shafts being driven by rotational motion from the output gear of a different one of the plurality of gear pairs;
wherein at least one of the plurality of output shafts is arranged for driving an input gear of one of the plurality of gear pairs;
wherein a ratio of rotational speed between the input shaft and one of the plurality of output shafts is a product of at least three of the gear ratios of the plurality of gear pairs;
wherein the plurality of gear pairs output in a single direction and have a binary relationship such that a total number of gear ratios from the plurality of gear pairs in the single direction is represented by $2^{n/2}$, where n equals a total number of the plurality of gear pairs in the single direction.

19. The gearbox according to claim 18, wherein the input gear to be driven by an output shaft is directly driven by such output shaft.

20. The gearbox according to claim 18, wherein the input gear to be driven by an output shaft is driven by such output shaft through one of the plurality of selectors.

21. The gearbox according to claim 18, wherein there are exactly six gear pairs, and the gearbox provides eight selectable non-zero output rotational speeds for a given rotational speed of the input shaft.

22. The gearbox according to claim 18, wherein there are exactly eight gear pairs, and the gearbox provides sixteen selectable non-zero output rotational speeds for a given rotational speed of the input shaft.

* * * * *